Figure 4:
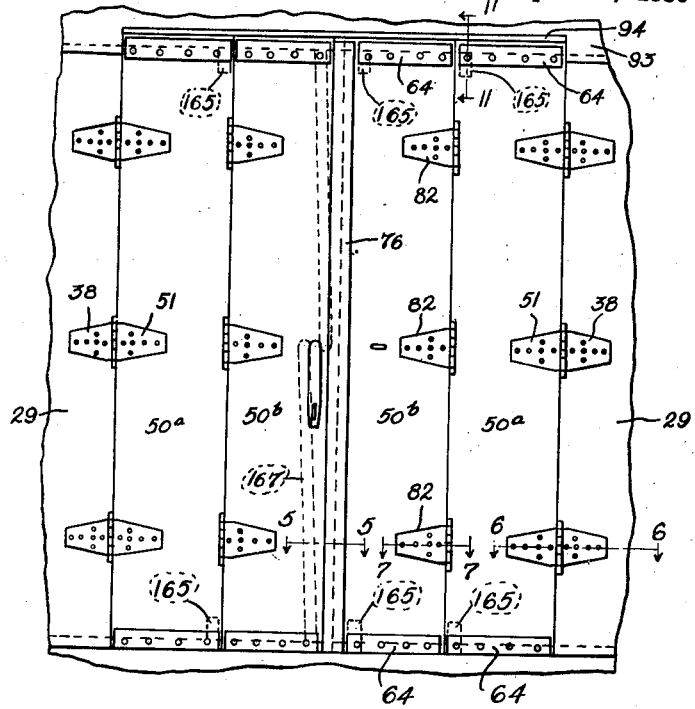

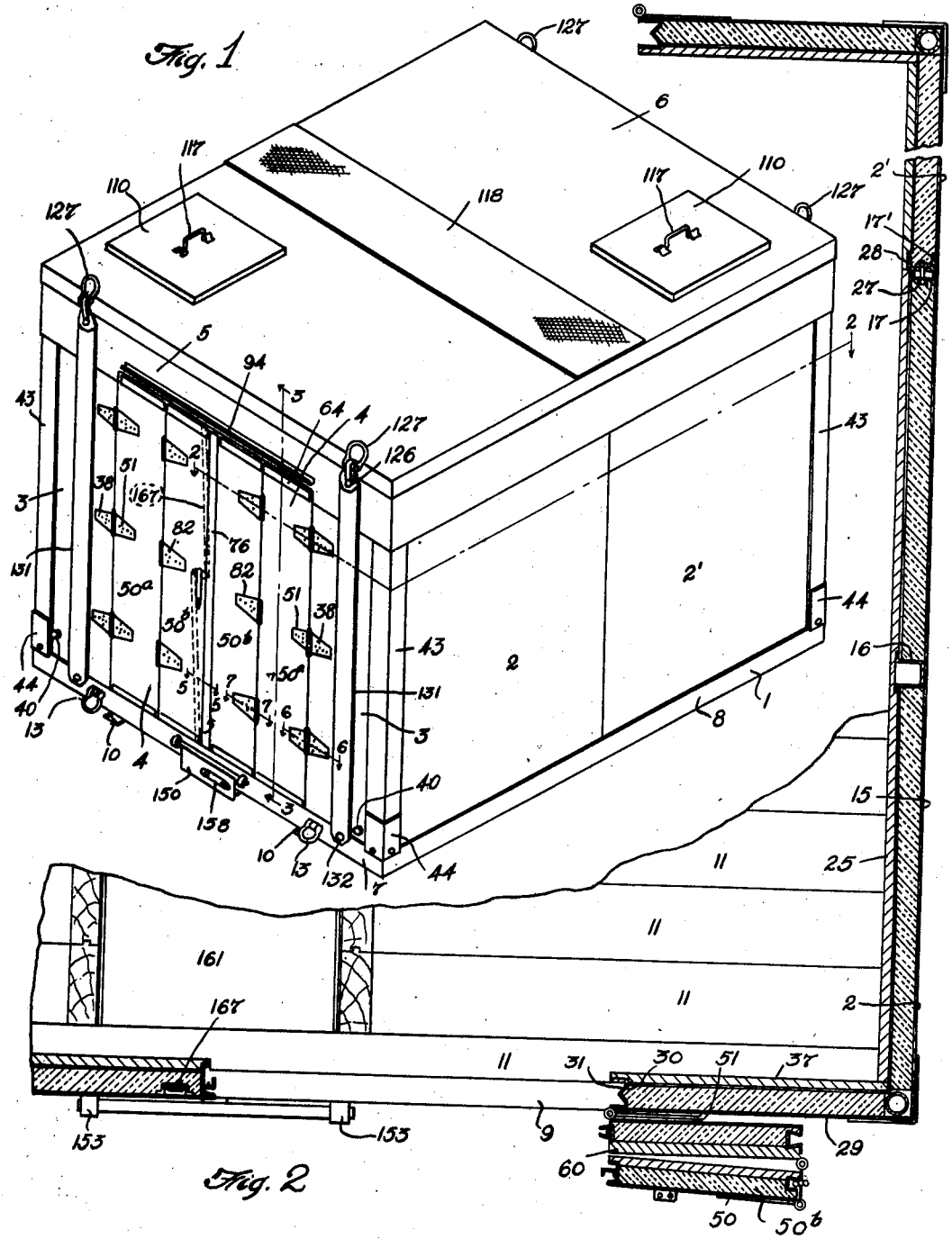

May 14, 1940.   A. HOWIE   2,200,277
CONTAINER
Filed Sept. 21, 1936   3 Sheets-Sheet 2
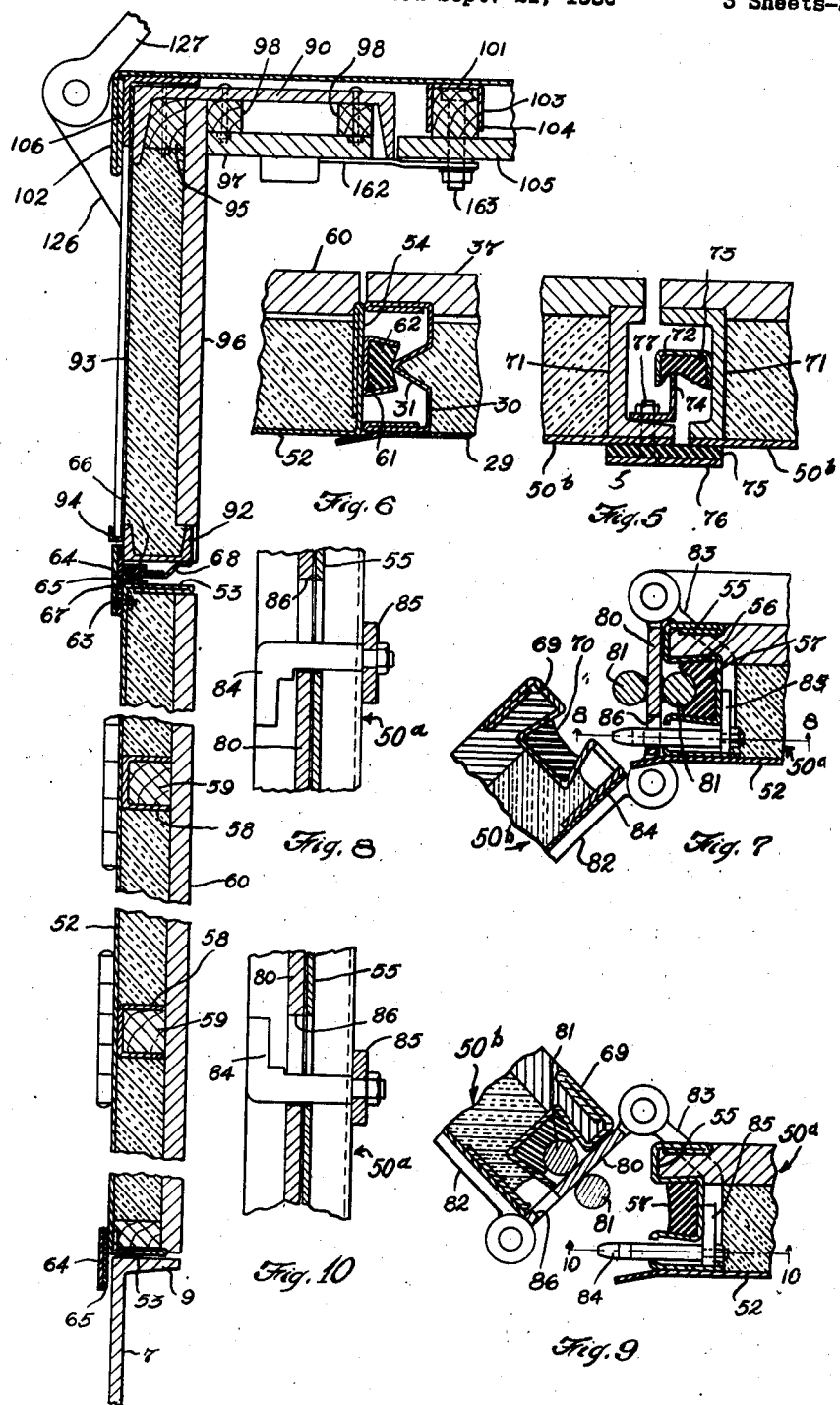

May 14, 1940.  A. HOWIE  2,200,277
CONTAINER
Filed Sept. 21, 1936   3 Sheets-Sheet 3

INVENTOR.
BY Alexander Howie
Fay, Oberlin & Fay
ATTORNEYS

Patented May 14, 1940

2,200,277

UNITED STATES PATENT OFFICE 2,200,277

CONTAINER

Alexander Howie, Cleveland Heights, Ohio

Application September 21, 1936, Serial No. 101,768

3 Claims. (Cl. 189—46)

This invention relates, as indicated, to containers, but has reference more particularly to the type of container known as an "outer" container, and which is usable in lieu of freight car or highway truck bodies.

Containers of this type may have various forms and dimensions, but must conform to railroads, and highway clearance limits, as well as to those of industry. The maximum width of a railroad car is governed by the clearance line established for general interchange service, which is now 10′9″. The maximum overall width of highway vehicles has been established at 8′0″ in all but two of the forty-eight states. Similarly, there are overall height limitations for highway vehicles and structures, the minimum overhead clearance on most main highways not exceeding 12′6″. With most highway truck platforms nearly 3′6″ above the road surface, the overall height of an outer container should not exceed 8′0″ for general service. Doors and openings in plant buildings and warehouses may impose even smaller overall dimensions for containers. Less definite limitations are imposed by existing standard lengths and load limits of railroad freight cars and of highway vehicles, and such standards must be considered in determining container dimensions.

In view of the aforesaid dimensional limitations, it has been tentatively determined that an outer container, of the dimensions—length, 10 ft., width, 8 ft., height, 8 ft., and having a load capacity of 500 cu. ft. and 25,000 pounds could be utilized to carry approximately 85% of all tonnage suitable for carriage on freight-carrying vehicles, and would thereby greatly increase the efficiency of such vehicles.

It is a primary object of the present invention to provide a container of the character described, which is designed for fast and economical freight service, can be used to carry efficiently a large proportion of all dry materials, in bulk or packaged, which is usable interchangeably on all land and water transport vehicles, which will stimulate regular scheduled movements of goods in quantities desired by shippers and consigners and which will greatly reduce empty return hauls by rail and highway now required because present freight vehicles are not adapted to carry a sufficiently wide variety of goods.

Further objects of the invention are to provide a container which is of a collapsible character, whereby it will occupy a minimum of space when not in use, which is adapted to permit handling thereof by lift-truck, rolling, sliding and hoisting, and which is suitable for handling products of a perishable nature.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various structural forms in which the principle of the invention may be used.

Figure 11:
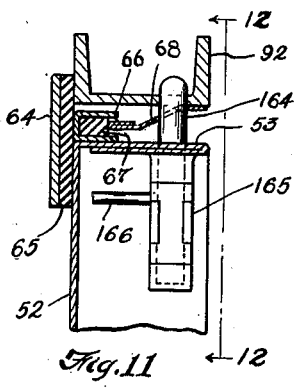
Figure 12:
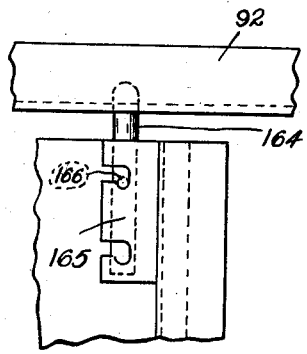

In said annexed drawings:

Fig. 1 is a perspective view of a container embodying the novel features of the invention; Fig. 2 is a fragmentary cross-sectional view, taken on the line 2—2 of Fig. 1; Fig. 3 is a fragmentary cross-sectional view, taken on the line 3—3 of Fig. 1; Fig. 4 is a fragmentary elevation of one end of the container, showing the doors; Figs. 5 and 6 are cross-sectional details, taken on the lines 5—5 and 6—6 respectively of Figs. 1 and 4; Fig. 7 is a cross-sectional detail, as indicated by the lines 7—7 in Figs. 1 and 4, showing the manner in which the sections are folded when it is desired to open only the inner half of each door; Fig. 8 is a cross-sectional detail taken on the line 8—8 of Fig. 7; Fig. 9 is a view similar to Fig. 7, but showing the manner in which the hinge bar is released when it is desired to open the doors fully, as shown in Fig. 2; Fig. 10 is a cross-sectional detail, taken on the line 10—10 of Fig. 9; Fig. 11 is a cross-sectional detail, taken on the line 11—11 of Fig. 4; and Fig. 12 is a fragmentary elevation, as indicated by the arrows 12—12 in Fig. 11.

The container, as shown in Fig. 1, comprises a base or platform 1, side wall units 2 and 2′, end wall units 3, door units 4, a cornice or top band 5 and a top or cover 6.

The base or platform 1, as shown most clearly in Figs. 1 and 2, consists of four structural channels 7 and 8, the flange 9 of these channels extending inwardly towards the interior of the frame.

The base further includes skids in the form of structural I-beams 10, the webs of which are recessed to receive the lower flanges of the channels 7, which are welded to the I-beams 10 along the recesses. The upper flanges of the skids 10 lie in a plane somewhat below the plane of the upper flanges of channels 7 and 8, thereby providing space for a floor which preferably consists of boards 11 of hardwood or the like. Portions of the outermost boards underlie the upper flanges of channels 7, while the ends of the boards underlie the upper flanges of channels 8 and rest on angles 12 secured to the channels 8 and extending longitudinally thereof. Shackles or rings 13 are pivotally secured to the channels 7 to facilitate hoisting or lifting of the container. Extending between the channels 7 and parallel with the skids 10 are a pair of spaced channels 14 which serve to support the floor boards and also as supports for the chutes to be presently described.

The side wall units 2, of which there are two in number, are identical with each other in construction, so that a description of one of those units will be sufficient. The construction of these units is best shown in Figs. 1 and 2.

Each side wall unit 2 comprises a rectangular sheet metal panel 15 having secured thereto, as by welding the web thereof to the inner surface of the panel, a central vertically extending reinforcing channel 16, formed of sheet metal. The panel is also provided at one edge with a shallow vertically extending channel 17, formed of sheet metal, and secured to the panel as by welding one flange of the channel to the panel.

The side wall units 2', of which there are also two in number, are identical in construction with the units 2, with the exception that the edge of such unit which abuts the unit 2, is provided with a structural channel 17', which is somewhat deeper than the channel 17 and is considerably wider than the latter, being, in fact, as wide as the channel 16 is deep. Moreover, the channel 17' is so positioned that the flanges of channel 17 abut the web of the channel 17'. The units 2 and 2' are secured to each as by bolts 27 and nuts 28 (see Fig. 2).

The end wall units, of which there are four in number, are identical in construction, so that a description of one unit will suffice. The construction of these units is best shown in Figs. 1, 2 and 6.

Each end wall unit comprises a rectangular sheet metal panel 29 having secured adjacent one edge thereof a sheet-metal channel 30, the ends of which are indented to form a rib 31 of generally V-shaped cross-section. The end wall unit is also provided adjacent one of its edges with a plurality of butt hinge halves 38, which support the doors of the container. Plywood linings 25 and 37 may be secured to the side and end wall respectively to provide an insulating space. The side and end wall units are removably secured in position to facilitate the disassembly of the container when desired.

Each end of the container is provided with a door unit 4, which extends between the channels 30 and the end wall units.

The door units are similar in construction, and each consists of a pair of doors 50. Each door is secured as by hinge plates 38 and consists of two sections 50a and 50b, secured to each other by hinges of special construction which will be presently described.

Each door section 50a consists of a rectangular sheet metal panel 52 provided at its upper and lower edges with inwardly extending flanges 53, at the vertical edge adjacent the hinge plates 51 with a similar flange 54, and at its other vertical edge with a channel 55, the web of which is recessed as at 56 to provide a seat for a cushion strip 57 of rubber or the like. The panel 52 has secured thereto reinforcing channels 58, in which are secured nailing strips 59 for supporting a lining 60 of plywood or the like. In order to seal the joint between door section 50a and the end wall unit, the flange 54 is provided with a channel 61, in which is mounted a cushion strip 62 of rubber, which is engaged and compressed by the rib 31 of the channel 30, when the door section is closed, as clearly shown in Fig. 6. Additional sealing at this joint is provided by extending the panel 29 of the end wall unit over the joint, portions of the extension being of course cut away to accommodate portions of the hinges.

Secured to the panel 52 adjacent the upper and lower edges thereof, as by screw bolts 63 and metal strips 64, are strips of rubber 65 which serve to seal the joints between the door section 50a and the cornice unit and between such section and the base when the doors are closed (see Fig. 3). In addition, there is secured to the upper flange 53 a channel 66 containing a cushion strip 67 of rubber which is engaged and compressed by a bar 68 on the cornice unit.

The door section 50b is similar in construction to the section 50a, except that instead of being flanged at the vertical edge adjacent the channel 55 of section 50a it is provided with a channel 69, similar in all respects to the channel 55, and the web of which is recessed to provide a seat for a cushion strip 70 of rubber or the like. The other vertical edge of the section 50b is provided with a channel 71, the front flange of which is narrower than the rear flange, and the web of which is provided with a channel 72 in which is mounted a cushion strip 73 of rubber. This strip 73 cooperates with an angle 74 on the channel 71 of the adjacent door section 50b to form a water-tight joint when the doors are closed, as shown in Fig. 5. Further sealing at this joint is provided by a rubber strip 75 which is secured to the adjacent door section, as by means of a metal strip 76 and the screw bolts 77 which secure the angle 74 to the channel 71.

An important feature of the invention is the special type of hinge which is used to join the door sections 50b to section 50a. Each of these hinges consists of a hinge bar 80 which extends substantially the full length of the door and has welded to the opposite sides thereof rods 81, designed to engage the cushion strips 57 and 70 when the doors are closed so as to provide a water-tight and noiseless joint between the door sections. Pivotally secured to the front edge of the bar 80 is a plurality of hinge plates 82, which are rigidly secured to the edge of the front panel of door section 50b. Pivotally secured to the rear edge of the bar 80 is a plurality of hinge plates 83 which are rigidly secured in any suitable manner to the edge of door section 50a at the rear thereof.

When it is desired to open only the section 50b of the door, the bar 80 is locked to the channel 55, as shown in Figs. 7 and 8. For this purpose, a latch 84 is provided, which is secured as by a plate 85 to the door section 50a, and which, when in the position shown in Fig. 8, engages the bar 80 to lock the bar to the channel 55. With the latch in this position the door section 50b may be folded back against the front face of the door section 50a.

When it is desired to open both sections of the door, the bar 80 is released from engagement with the channel 55, as by turning the latch to the position shown in Fig. 10, whereupon the bar may be moved away from the channel 55, the latch during such movement passing through an opening 86 in the bar. When this is done, the door section 50a may be folded back upon the end wall unit, and the section 50b may be folded upon the inner surface of section 50a in the manner shown in Figs. 2 and 9, leaving the door opening, as shown in Fig. 2, entirely clear and free of obstructions, and thereby facilitating loading and unloading of the container.

The cornice or top band 5 is shown most clearly in Figs. 1 and 3. It comprises an upper frame consisting of wide structural channels 90 and narrow structural channels 91, welded together at the corners, and a lower frame consisting of structural channels 92 similarly welded together and provided with metal strips 92a. These frames are connected by a sheet metal covering 93, which, except for the portions thereof above the door openings, extends below the joint between the wall units and the cornice, so as to preclude entry of water at this joint. Above the door openings, the sheet metal covering 93 is provided with L-shaped flanges 94, forming gutters for diverting the flow of water past both sides of the doorway.

The sheet metal covering 93 is suitably reinforced, as by means of spaced vertically extending channels similar to the channels 16 of the wall units and is also provided with nailer strips 95 for securing a plywood lining 96 to the band. Ceiling liners 97 are also secured to the channel 90 as by means of nailer strips 98.

The top or cover 6 is best seen in Figs. 1 and 3. It comprises a substantially rectangular metal sheet 101 having down-turned flanges 102 at its edges and provided on its lower surface with reinforcing channels 103 containing nailer strips 104 for supporting a plywood lining 105.

For the purpose of admitting air into the container, for ventilation thereof, the metal sheet 101 has welded thereto a plurality of spaced angle clips 106, whereby the cover is held in spaced relation to the top band and air may enter the space between the sheet 101 and lining 105, passing into the container through ventilator grilles.

To facilitate filling of the container with bulk material or ice for refrigeration purposes hatches are provided in the cover, as shown in Fig. 1. For this purpose, the metal sheet 101 is provided with upstanding flanges forming a rectangular opening adapted to be closed by suitable hatch covers 110. To facilitate handling of the hatch covers, each is provided with a handle 117, which lies flat when not in use, and; in addition a checkered metal plate or catwalk 118, the use of which is obvious, is secured to the cover 6, extending the entire width of the container.

In addition to the shackles or rings 13, other lifting devices are provided, as shown in Fig. 1. Each of such devices comprises a base plate having a bracket or lug 126 projecting outwardly therefrom and to which is pivotally secured a ring or shackle 127 for attachment to a hoisting device.

To facilitate unloading of bulk material from the container, chutes are provided at opposite ends of the base or platform adjacent the door openings, as clearly shown in Figs. 1 and 2.

The opening 161 in the floor boards 11 is disposed above the chute and may be closed as by a removable trap-door (not shown). The chute has a stationary and a movable portion, the latter being held up when not in use by means of a gate 150 supported by brackets 153. The lever 158 when swung in a clockwise direction acts to open the gate.

For locking the cover 6 to the top band, locking devices, such as shown in Fig. 3, are provided, consisting of a locking lever 162, which is pivotally mounted on a pin 163 on the cover, the locking lever being swingable under the lining 97 of the top band.

For locking each section to the base and top band, locking devices, such as shown in Figs. 4, 11 and 12 are provided. Each comprises a locking bolt 164, slidably mounted in a bearing 165 secured to the door section adjacent the top and bottom. This bolt may be projected into openings in the channels 7 or 92, as the case may be, or may be retracted from such channels when the door sections are to be opened, the bolt being provided with an actuating pin 166 to facilitate movement of the bolt. This pin may be utilized to support the bolt on the bearing in projected or retracted position, as apparent from Fig. 12.

A locking device 167 similar to that employed for the gate 150, may be used for locking the doors after the door sections have been closed.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a container of the type having a door opening and doors for closing said opening, each of which doors comprises at least two sections; means for permitting one of the door sections to be selectively folded against the inner or outer surface of the other section, said means comprising a hinge bar, hinge plates pivotally connected to the edge of said bar and secured to the front of one of the door sections adjacent one edge, hinge plates pivotally connected to the opposite edge of said bar and secured to the rear of the other door section adjacent one edge, and means for locking said bar against movement relatively to one of said sections.

2. In a container of the type having a door opening and a door for closing said opening, which door comprises at least two sections and means for connecting said sections; said means comprising a hinge bar, hinge plates pivotally connected to one edge of said bar and secured to the front of one of the door sections adjacent one edge, hinge plates pivotally connected to the opposite edge of said bar and secured to the rear of the other door section adjacent one edge, and means secured to one of the door sections and engageable with said bar to lock the latter against movement relatively to said section.

3. In a container of the type having a door opening and a door for closing said opening, which door comprises at least two sections and means for connecting said sections; said means comprising a hinge bar having an opening therein, hinge plates pivotally connected to opposite edges of said bar and respectively secured to said door sections adjacent their edges, and a latch secured to one of said door sections and adapted to be passed through said bar opening and turned, whereby to latch said bar against movement relatively to the section to which the latch is secured.

ALEXANDER HOWIE.